United States Patent [19]

Lindbom

[11] Patent Number: 4,646,648
[45] Date of Patent: Mar. 3, 1987

[54] CARRIER MOVING APPARATUS WITH VARIABLE RATIO TRANSMISSION

[76] Inventor: Torsten H. Lindbom, 1849 Kedron Cir., Fort Collins, Colo. 80524

[21] Appl. No.: 712,530

[22] Filed: Mar. 18, 1985

[51] Int. Cl.⁴ .................. B61C 9/00; B61C 11/00; F16H 15/12
[52] U.S. Cl. .................. 104/165; 104/170; 105/100; 105/130; 74/200
[58] Field of Search .......... 104/165, 170; 105/100, 105/130; 74/200; 474/131

[56] References Cited

U.S. PATENT DOCUMENTS

| | | | |
|---|---|---|---|
| 246,366 | 8/1881 | Borchardt | 74/200 |
| 568,367 | 9/1896 | Osgood | 74/200 |
| 617,738 | 1/1890 | Hale | 74/200 |
| 729,289 | 5/1903 | De Loach | 74/200 |
| 761,610 | 5/1904 | Riblet | 104/165 |
| 1,165,353 | 12/1915 | Woodworth | 74/200 |
| 1,401,505 | 12/1921 | Sykora | 74/200 |
| 3,356,040 | 6/1965 | Fonden | 104/130 |
| 3,690,267 | 9/1972 | Sutton | 104/165 |
| 3,818,837 | 6/1974 | Jacoby et al. | 104/166 |
| 3,842,752 | 10/1974 | Harwick | 104/166 |
| 3,858,626 | 1/1975 | Ribordy | 104/166 |
| 3,858,707 | 1/1975 | Block et al. | 198/345 |
| 3,929,079 | 12/1975 | Eliassen | 104/165 X |
| 4,036,148 | 7/1977 | Jones et al. | 104/166 |
| 4,281,556 | 8/1981 | Weishew | 74/37 |
| 4,355,580 | 10/1982 | Scheel | 104/166 |
| 4,367,683 | 1/1983 | Tokunaga | 104/166 |

Primary Examiner—Robert B. Reeves
Assistant Examiner—Scott A. Werny
Attorney, Agent, or Firm—Sheridan, Ross & McIntosh

[57] ABSTRACT

An endless loop conveyor system is disclosed wherein a plurality of carriers are moved to one or more work stations and one or more buffer stations so that a product may be assembled on each carrier at the work stations. Power is extracted from a continuously moving belt by holding the belt against a power wheel with an L-shaped member. A variable ratio transmission having a pair of power transmitting wheels, one contacting the power wheel, the other contacting a drive wheel, uses the extracted power to accelerate or decelerate each carrier depending on the locations of contact. A non-contacting position is provided for rest at a work station.

3 Claims, 5 Drawing Figures

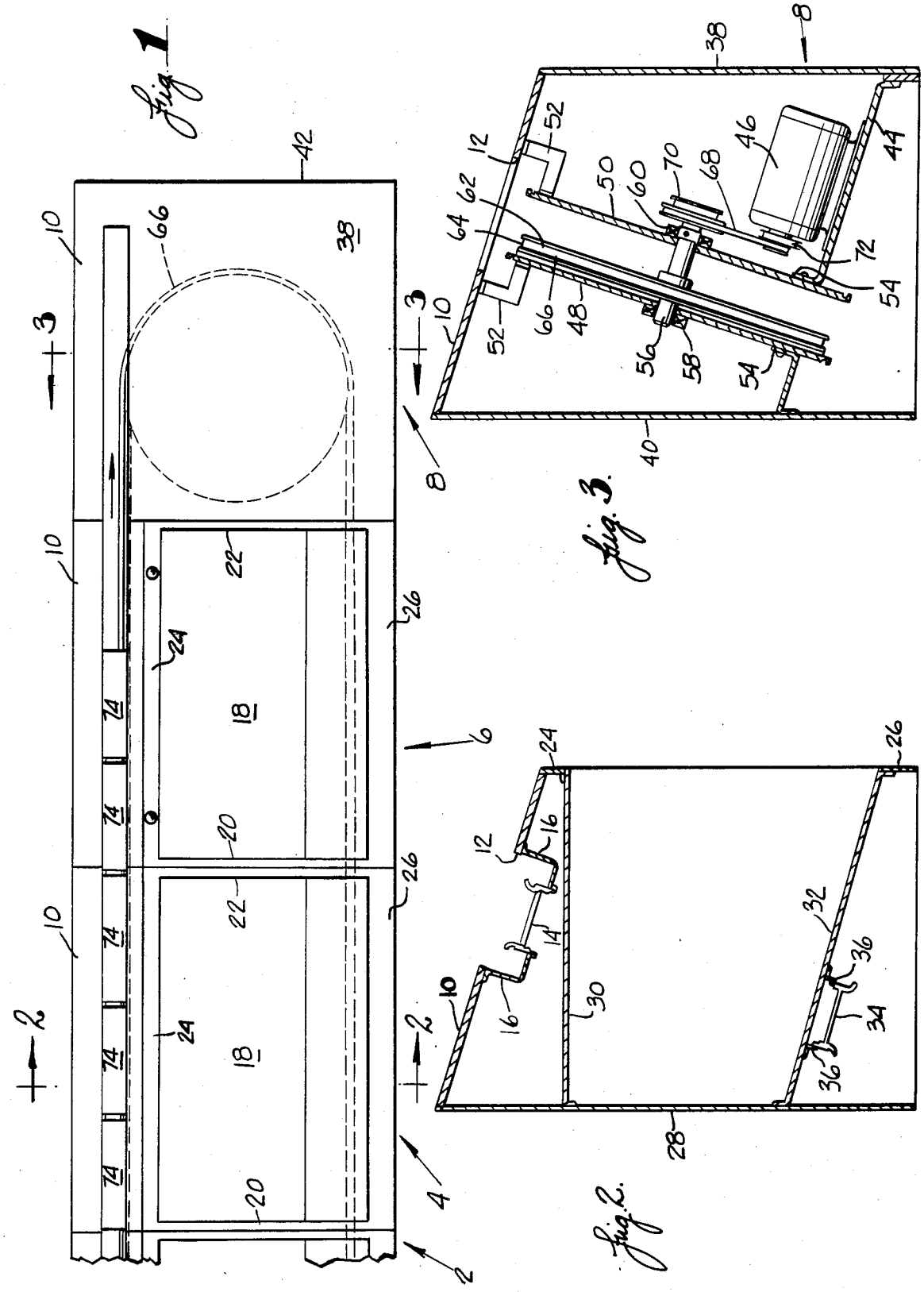

CARRIER MOVING APPARATUS WITH VARIABLE RATIO TRANSMISSION

FIELD OF THE INVENTION

This invention relates to apparatus and method for moving a carrier to and from a desired destination and more particularly to such a carrier that is used as a base for supporting an article that is to be worked on, such as by adding parts thereto, in a production assembly line operation.

BACKGROUND INFORMATION

Numerous mechanisms have been proposed or devised for use in carrying a workpiece or article from one station to another station. In many situations, it is desirable to be able to return the carrier that transports the workpiece back to the station from which it originated or back to another station along the path taken by the carrier. With regard to prior art conveying systems and methods, the return of the carrier often requires significantly more hardware and the process itself is a cumbersome one. For example, in one known method of operation, a carrier is moved along a path using a rod that rotates. Movement of the carrier results from a carrier wheel contacting the rotating rod. Basically, the path that the wheel follows on the rod is comparable to the thread path of a screw. The angle of the carrier wheel relative to the rod controls the speed of the carrier. A disadvantage, however, of this type of conveying system is the complexity associated with the return of the carrier to the starting point of the conveying system. In particular, each end of the conveying system requires some device for transporting the carriers between the forwardgoing and the return portion of the conveyor system.

To overcome this drawback relating to the return of the carrier, the present invention utilizes an endless loop around which the carrier is able to move and in which power is extracted from an endless, continuously moving belt.

SUMMARY OF THE INVENTION

This invention is directed to apparatus for moving a carrier to and from a plurality of stations. The carrier serves as a base for supporting an article on which work is to be performed, such as the addition of parts thereto, to form a product in a production assembly line operation. The movement of the carrier is accomplished by extracting power from a continuously moving belt and using that power through a variable ratio transmission to move the carrier. The plurality of stations include one or more buffer stations where one or more carriers may be stored, one or more work stations where work, such as the addition of parts to an article, is performed and end stations which are used to house the mechanisms used to provide movement for the continuously moving belt.

In the preferred embodiment of the invention, the carrier is provided with means for maintaining a rotatable power wheel in contact with a continuously moving belt so that the power wheel is rotated when desired. A variable ratio transmission is used to transfer the power from the power wheel to a rotatable drive wheel. The variable ratio transmission preferably comprises a pair of power transmitting wheels, one of which is in contact with the power wheel and the other of which is in contact with the drive wheel. The drive wheel is in contact with a track so that rotation of the drive wheel moves the carrier over the track. A recess is formed in the central portion of the inner surface of the power wheel so that when the carrier is at rest at a buffer station or a work station, the one power transmitting wheel does not contact the power wheel. Means are also provided to lock the power wheel with the continuously moving belt when full acceleration has been obtained so that the carrier moves at the same speed as the continuously moving belt.

Based on the foregoing, a number of major advantages of the present invention are readily seen. The present invention includes a carrier that is returnable to a desired destination using an endless loop configuration. As a result, no relatively complicated transfer mechanisms are utilized. Additionally, the present invention extracts power efficiently and simply from an endless, continuously moving belt. In conjunction with the desired movement of the carrier, a variable ratio friction drive is employed for controlling the acceleration and deceleration of the carrier.

Other features and advantages of the invention will be apparent from the following more particular description of preferred embodiments as illustrated in the accompanying drawing in which like reference characters refer to the same parts throughout the various views. The drawing is not necessarily to scale, emphasis instead being placed upon illustrating the principles of the invention.

BRIEF DESCRIPTION OF THE DRAWING

FIG. 1 is a schematic side elevation of a conveyor system of this invention;

FIG. 2 is a view in cross section of a work or buffer station;

FIG. 3 is a view in cross section of one end station;

DETAILED DESCRIPTION OF THE INVENTION

Figure 4:
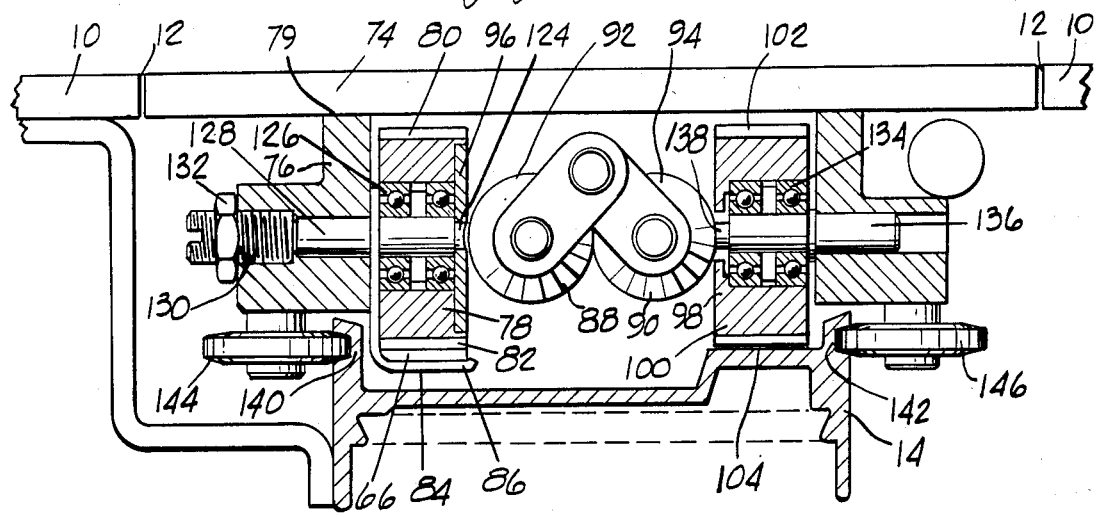
FIG. 4 is a view in cross section of the power mechanisms.

In FIG. 1, there is schematically illustrated a portion of an end station 2, a buffer station 4, a work station 6 and another end station 8 of a conveyor system. It is to be understood that the complete conveyor system will comprise one or more buffer and one or more work stations. Each of the stations has an upper surface 10 that is tilted at an angle of about 16° to the horizontal. As illustrated in FIG. 2, the upper surface 10 is provided with an opening 12. An upper track 14 is supported by brackets 16 which are secured to the upper surface 10. The buffer station 4 and the work station 6 each have a central opening 18 defined by upstanding legs 20 and 22 joined by horizontal upper 24 and lower 26 panels and a rear panel 28. An upper support structure 30 extends between the upper panel 24 and the rear panel 28 and a lower support structure 32 extends between the lower panel 26 and the rear panel 28. The lower support structure 32 is tilted at the same 16° angle as the upper surface 10. A lower track 34 is secured to the under side of the lower support structure 32 by brackets 36.

The end section 8, illustrated in FIG. 3, has a front panel 38, a rear panel 40 and a side panel 42. A support structure 44 extends between the front panel 38 and the rear panel 40 and an electric motor 46 is mounted on the support structure 44. A pair of parallel plates 48, 50 are secured to the upper surface 10 by brackets 52 and to the support structure 44 by brackets 54. A rotatable shaft 56 is mounted in bearings 58, 60 mounted on plates 48, 50, respectively. A wheel 62 is mounted on the shaft 56 for rotation therewith and has a grooved outer surface 64 for receiving a portion of an endless conveyor belt 66. The endless belt 66 may be of any configuration but in the preferred embodiment, it has a cogged outer surface for a purpose to be described below. An idler wheel (not shown) also having a grooved outer surface is mounted for rotation in the other end station 2 so that the conveyor belt 66 extends therebetween with other portions of the endless conveyor belt being located in the buffer stations 4 and the work stations 6. A drive belt 68 extends between a pulley 70 on the end of the shaft 56 and a pulley 72 on the motor 46 so that rotation of the motor 46 rotates the shaft 56 and the wheel 62 to provide movement for the endless belt 66. The outer surface of each plate 48, 50 is semi-circular and is provided with an outer configuration similar to that of the tracks 14 and 34 so as to provide a track connecting tracks 14 and 34 for a purpose described below. The idler section (not shown) has plates similar to plates 48 and 50 so that a complete track exists for the endless movement of the carriers as described below.

Figure 5:
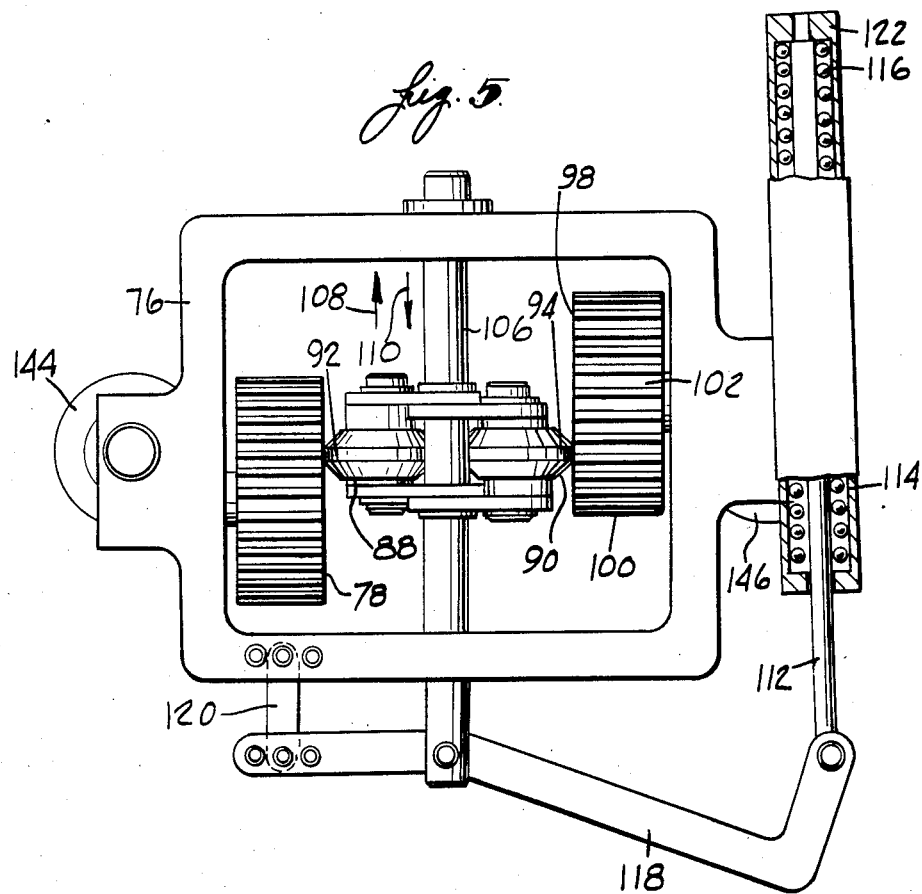
FIG. 5 is a top plan view of the power mechanisms.

The power mechanisms for driving each carrier 74 is illustrated in FIGS. 4 and 5. A frame 76 is secured to the lower surface 79 of each carrier 74. On one side of the frame 76 there is rotatably mounted a power wheel 78 having a cogged outer or peripheral surface 80. The endless belt 66 is also provided with a cogged outer surface 82 for engagement with the cogged outer surface 80 of the power wheel 78. An L-shaped member 84 is secured to the frame 76 and functions to keep a portion of the cogged surface 82 of the endless belt 66 in contact with the cogged outer surface 80 of the power wheel 78 so that movement of the endless belt 66 rotates the power wheel 78. A lip 86 prevents the endless belt 66 from moving off the L-shaped member 84.

The preferred variable ratio transmission is illustrated in FIGS. 4 and 5 and comprises a pair of power transmitting wheels 88 and 90 having their peripheral surfaces 92 and 94 in contacting relationship. The peripheral surface 92 of the power transmitting wheel 88 is in contact with side or inner surface 96 of the power wheel 78 so that rotation of the power wheel 78 rotates the power transmitting wheel 88. The peripheral surface 94 of the power transmitting wheel 90 is in contact with the side surface 98 of a driving wheel 100. The peripheral surface 102 of the driving wheel 100 is in contact with a surface 104 on the tracks 14 and 34. Preferably, the peripheral surface 102 is made of rubber and the driving wheel 100 is loaded against the tracks 14, 34 with a force of a few times the weight of the carrier 74 to allow a higher acceleration than can be achieved by a gravity loaded carrier. The rotation of the power transmitting wheel 88 by the power wheel 78 also rotates power transmitting wheel 90 which in turn rotates driving wheel 100 to move the carrier 74 over the path defined by the surface 104.

The speed of the carrier 74 is determined by the relative location of the contact between the power wheel 78 and the power transmitting wheel 88 and the relative location of the contact between the power transmitting wheel 90 and the driving wheel 100. The ratio of the variable ratio friction drive is varied by moving the power transmitting wheels 88, 90 along the axes of their centers. The speed ratio is low when the power transmitting wheels 88, 90 are relatively near the center of the power wheel 78 and the periphery of the driving wheel 100, respectively. A relatively high speed ratio occurs when the power transmitting wheels 88, 90 are relatively near the center of the driving wheel 100 and the periphery of the power wheel 78, respectively.

More specifically, the power transmitting wheels 88 and 90 are mounted on a rod 106 that is mounted in the frame 76 for reciprocal movement in the directions indicated by the arrows 108 and 110. A piston 112 in a cylinder 114 is normally urged by a spring 116 to an open position so that the rod 106 is moved in the direction of the arrow 108 to a full acceleration position by the pivoted lever 118 pivotally connected at one end to the piston 112, at an intermediate location to the rod 106 and the other end to a lever 120. The full acceleration position is when the contact between the power transmitting wheel 88 and the power wheel 78 is adjacent to the periphery of the power wheel 78 and the contact between the power transmitting wheel 90 and the driving wheel 100 is adjacent to but spaced from the center of the driving wheel 100. When it is desired to decelerate the carrier 75, means (not shown) are actuated to position a flag (not shown) so that the end 122 of the piston is moved into contact with the flag. The piston 112 is gradually moved to compress the spring 116 and move the rod 106 in the direction of the arrow 110. The carrier 74 decelerates as the contact between the power transmitting wheel 88 and the power wheel 78 moves toward the center of the power wheel 78. As illustrated in FIG. 4, the central portion 124 of the surface 96 of the power wheel 78 is recessed so that when the carrier has been completely decelerated, there is no contact between the power transmitting wheel 88 and the power wheel 78 and the carrier 74 is at rest. Means (not shown) are provided to lock the carrier 74 when at rest in a work station.

The power wheel 78 is mounted on a bearing 126 carried by a pin 128 secured in the frame 76 by a threaded connection 130 and a nut 132. The driving wheel 100 is mounted on a bearing 134 carried by a fixed pin 136 secured in the frame 76 with a portion 138 of the pin 136 being available for contact by the power transmitting wheel 90. As the carrier 74 reaches full acceleration, the power transmitting wheel 90 moves into contact with the portion 138 of the pin 136 causing a stoppage of the power transmitting wheel 90 which in turn causes stoppage of the power transmitting wheel 88 and the power wheel 78 to effectively lock the power wheel 78 to the endless belt 66 for movement therewith. The driving wheel 100 will rotate on the bearing 134 as the carrier 74 moves at the same speed as the endless belt 66. The upper track 14, the lower track 34 and the plates 48 and 50 are provided with grooves 140 and 142 for receiving portions of the wheels 144 and 146 rotatably mounted on the frame 76 for controlling and guiding the movement of the carrier 74. The wheels 144 and 146 are rubber covered and the driving wheel 100 also has a rubber surface 102. The use of two power transmitting wheels 88 and 90 allows the carrier 74 to be driven in the same direction as the direction of movement of the endless belt 66. One power transmitting wheel can be used but then the direction of movement of the carrier 74 is opposite to the direction of movement of the endless belt 66.

In operation, a plurality of carriers 74 are mounted on the track 14 with their wheels 144 and 146 in the recesses 140 and 142. This can be accomplished by any suitable means, such as by adjustably mounting one of the wheels 144 or 146. Also, the L-shaped member 84 of each carrier is positioned so that the endless belt 66 is positioned in the space between the L-shaped member 84 and the cogged outer surface 80 of the power wheel 78. When the endless belt 66 is set in motion by the motor 46, the plurality of carriers 74 will move until the end 122 of each carrier 74 contacts a flag so as to compress the spring 116 and move the rod 106 in the direction of the arrow 110 so as to cause such carrier 74 to decelerate until it comes to rest at a buffer or work station. In normal operations, a plurality of carriers are stored at the buffer stations 4, it being understood that the complete conveyor system may have one or more buffer stations 4 and one or more work stations 6. The storing of the carriers 74 at the buffer stations 4 is to accommodate for the variation in cycle time that often occurs due to disturbances in the assembly operations.

When it is desired to move a specific carrier 74, the flag is moved from its position in contact with the end 122. This allows spring 116 to move piston 112 and to move rod 106 in the direction of the arrow 108. This allows the power wheel 78, which is being rotated by the contact of its cogged outer surface 80 with cogged outer surface 82 of the moving endless belt 66, to transmit power through the power transmitting wheels 88 and 90 to rotate driving wheel 100 to accelerate the carrier 74, as described above. The acceleration of the carrier 74 will continue until the power wheel 78 is locked, as described above, and the carrier is moving at the same velocity as the moving endless belt 66. Movement of the carrier will continue until it contacts another flag at which time the carrier 74 will be decelerated, as described above. Each carrier 74 will be stopped at the end station 8 so that the product that has been assembled on the carrier 74 can be removed. When the carrier 74 enters the end station 8 the L-shaped member 84 is able to lift the belt 66 slightly from the wheel 62 to reduce noise that might otherwise result. The carrier is then moved over the tracks on the plates 48 and 50 and over the track 34, through the idler assembly and then back on track 14. Means are provided on each carrier 74 so that in a collision with another carrier, the spring 116 of the colliding carrier 74 will be compressed to decelerate the carrier.

The buffer stations 4 and the work stations 6 are bolted together so that the conveyor system can easily be expanded or contracted as needed. As stated above, the surface 10 is tilted at an angle of about 16° to facilitate manual as well as automatic assembly of production parts. The 16° tilt allows chutes for the feeding of parts to be in the same plane as the carrier. Also, this 16° tilt provides a space under the conveyor for the legs and knees of a sitting operator.

While the preferred embodiments of the invention have been illustrated and described herein, it may be otherwise embodied and practiced within the scope of the following claims.

What is claimed is:

1. Apparatus for moving a carrier means to and from a plurality of stations comprising:
   carrier means having a frame;
   a continuously moving endless belt, said carrier means using said belt to move both in a first direction from a starting position and in a second direction returning towards said starting position;
   first means including a power wheel associated with said carrier means for extracting power from said belt, said power wheel rotably mounted on said carrier means and having a peripheral surface and an inner surface;
   means for ensuring contact between said power wheel and said continuously moving endless belt so that said power wheel is rotated by said belt;
   first tract means along which said carrier means is moved in said first direction;
   second track means, spaced from said first track means, along which said carrier means is moved in said second direction;
   second means including a driving wheel having a peripheral surface and an inner surface and being rotatably mounted on said carrier means and being operatively associated with said first track means for using the power extracted from said belt to move said carrier means over said first track means, said carrier means and said driving wheel being moved along said first track means at a speed less than or equal to the speed of said belt during all the time said carriage means is moving, said second means further including means for ensuring contact between said driving wheel and said first and second track means, said second means also including a first power transmitting wheel having a peripheral surface and rotatably mounted on said carrier means and a second power transmitting wheel having a periphal surface in engagement with said periphal surface of said first power transmitting wheel and with said inner surface of said driving wheel so that said carrier means moves in the same direction as said belt, said peripheral surface of said first power transmitting wheel being in engagement with said inner surface of said power wheel and with said inner surface of said driving wheel; and
   means for varying the location of engagement of said first power transmitting wheel with said power wheel and with said driving wheel to vary the speed at which said carrier means moves over said first track means.

2. Apparatus for moving carrier means to and from a plurality of stations comprising:
   carrier means;
   a continuously moving endless belt;
   first means including a power wheel for extracting power from said belt;
   track means along which said carrier means is movable;
   second means including a driving wheel operatively associated with said carrier means and said track means for using the power extracted from said belt to move said carrier means over said track;
   power transmitting wheel means positioned between said power wheel and said driving wheel;
   means for locking said power wheel to said belt so that said carrier means moves at the same speed as said belt, said means for locking including pin means positioned substantially in the central portion of said driving wheel and including a portion that engages said power transmitting wheel means to effectively lock said power wheel to said endless belt; and
   means for moving said power transmitting wheel means out of engagement with said power wheel so that there is no movement of said power transmitting wheel means and said driving wheel so that said carrier means is at rest, said means for moving out of engagement including a recessed portion formed in said power wheel and being located substantially in the central portion of said power wheel.

3. Apparatus as in claim 2 and further comprising; spring means for use in accelerating and decelerating said carrier means.

* * * * *